US006975729B1

(12) United States Patent
Perlman

(10) Patent No.: US 6,975,729 B1
(45) Date of Patent: Dec. 13, 2005

(54) METHOD AND APPARATUS FOR FACILITATING USE OF A PRE-SHARED SECRET KEY WITH IDENTITY HIDING

(75) Inventor: Radia J. Perlman, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 959 days.

(21) Appl. No.: 09/640,465

(22) Filed: Aug. 15, 2000

(51) Int. Cl.[7] .............................................. H04L 9/08
(52) U.S. Cl. .................. 380/277; 713/156; 713/171
(58) Field of Search ............. 380/1–300; 713/150–175

(56) References Cited

OTHER PUBLICATIONS

Publication entitled, "The Photuris Session Key Management Protocol" by Phil Karn of Qualcomm and W. A. Simpson of DayDreamer, Network Working Group, Internet Draft, Mar. 1995, pp. 1-31.
"Network Security Private Communication in a Public World," by Charlie Kaufman, Radia Perlman, and Mike Speciner, 1995, Prentice-Hall, Inc., ISBN 0-13-061466-1, pp. 147-150.
"IKE Base Mode," by Y. Dayan and S. Bitan, found at http://www.ietf.cnri.reston.va.us-internet-drafts-draft-ietf-ipsec-ike-base-mode-02.txt., Internet Engineering Task Force, pp. 1-6.

Primary Examiner—Gregory Morse
Assistant Examiner—Ellen C Tran
(74) Attorney, Agent, or Firm—Park, Vaughan & Fleming LLP

(57) ABSTRACT

One embodiment of the present invention provides a system that facilitates a key exchange that operates with a pre-shared secret key and that hides identities of parties involved in the key exchange. The method operates by establishing a negotiated secret key between a first party and a second party by performing communications between the first party and the second party across a network in a manner that does not allow an eavesdropper to determine the negotiated secret key. Next, the system encrypts an identifier for the first party using the negotiated secret key and a group secret key to form an encrypted identifier. This group secret key is known to members of a group, including the first party and the second party, but is kept secret from parties outside of the group. Next, the system sends the encrypted identifier from the first party across the network to the second party. This allows the second party to decrypt the encrypted identifier by using the negotiated secret key and the group secret key, so that the second party can use the identifier to lookup the pre-shared secret key that was previously established between the first party and the second party. This pre-shared secret key is subsequently used in forming at least one subsequent communication between the first party and the second party.

22 Claims, 5 Drawing Sheets

METHOD AND APPARATUS FOR FACILITATING USE OF A PRE-SHARED SECRET KEY WITH IDENTITY HIDING

BACKGROUND

1. Field of the Invention

The present invention relates to encryption and computer security. More specifically, the present invention relates to a method and an apparatus for facilitating a key exchange protocol that operates with a pre-shared key and that hides the identities of entities involved in the key exchange.

2. Related Art

Recent advances in computer networks make it easier to access a computer system from a remote location. For example, "road warrior" with a laptop computer can access a server at a central office in order to receive email or access files from the server. However, providing this ability can lead to security problems because an attacker may also be able to access the organization's computer systems. Furthermore, even if the attacker is not able to access the organization's computer systems, the attacker may be able to eavesdrop on communications between the remote user and the organization's computer systems.

In order to guard against such attacks, an organization can install a "firewall" to filter all communications with an external network, and a remote user can be given a secret key that is known only to the remote user and the firewall. This secret key can then be used to encrypt subsequent communications between the remote user and the firewall.

The remote user can then be required to authenticate itself to the firewall in order to gain access to protected computer systems within the firewall. This authentication can be accomplished by sending an identifier for the remote user to the firewall. In response to this identifier, the firewall sends a challenge to the remote user. The remote user encrypts this challenge using a pre-shared secret key that was previously agreed upon between the remote user and the firewall, and then sends the encrypted challenge to the firewall. The firewall can then decrypt the encrypted challenge using the same pre-shared secret key to verify that the remote user possesses the pre-shared secret key. All subsequent communications between the remote user and the firewall are then encrypted using the pre-shared secret key. However, note that this technique requires the remote user to send its identifier to the firewall in the clear. Hence, an attacker can intercept the identifier and can thereby determine the identity of the remote user.

Another technique that can be used to establish a secure communication session between two computer systems involves an anonymous Diffie-Hellman exchange. A Diffie-Hellman exchange allows two computer systems to agree on a secret shared key, even though they can only exchange messages in public. Referring the FIG. 2, a Diffie-Hellman exchange begins by allowing two parties "A" and "B" to pick random numbers $S_A$ and $S_B$, respectively (steps 202 and 204). A then computes $T_A = g^{S_A}$ mod p, where p is a large prime number and g is number less than p with certain restrictions that are not important for a basic understanding of the method (step 206). Similarly, B computes $T_B = g^{S_B}$ mod p (step 208). Next, A and B exchange $T_A$ and $T_B$ (steps 210 and 212). A then computes the shared secret key as $T_B^{S_A}$ mod p (step 214). B similarly computes the shared secret key as $T_A^{S_B}$ mod p (step 216). Note that $T_B^{S_A} = (g^{S_A})^{S_B} = g^{S_A S_B} = (g^{S_A})^{S_B} = T_A^{S_B}$ mod p. A and B can then use this shared secret key to encrypt subsequent communications.

However, the Diffie-Hellman technique does not solve the authentication problem for an active attacker, because an active attacker can intercept communications from the remote user in order to impersonate the firewall. In this way, the active attacker will establish shared secrets with each end. Hence, even if the remote user encrypts its identifier with what it thinks is the shared secret key with the other end, the attacker is able to decrypt this identifier.

The Internet Engineering Task Force (IETF) has developed a standard to facilitate using pre-shared secret keys. (see htt—www.ietf.cnri.reston.va.us-internet-drafts-draft-ietf-ipsec-ike-base-mode-02.txt). The variant that uses pre-shared secret keys requires the Internet Protocol (IP) address of the remote user to be the identifier for the remote user. However, using the IP address of the remote user will not work if the remote user attempts to log in from a remote location with a different IP address.

Hence, what is needed is a method and an apparatus for facilitating a key exchange protocol that operates with a pre-shared key and that hides the identities of entities involved in the key exchange.

SUMMARY

One embodiment of the present invention provides a system that facilitates a key exchange that operates with a pre-shared secret key and that hides identities of parties involved in the key exchange. The method operates by establishing a negotiated secret key between a first party and a second party by performing communications between the first party and the second party across a network in a manner that does not allow an eavesdropper to determine the negotiated secret key. Next, the system encrypts an identifier for the first party using the negotiated secret key and a group secret key to form an encrypted identifier. This group secret key is known to members of a group, including the first party and the second party, but is kept secret from parties outside of the group. Next, the system sends the encrypted identifier from the first party across the network to the second party. This allows the second party to decrypt the encrypted identifier by using the negotiated secret key and the group secret key, so that the second party can use the identifier to lookup the pre-shared secret key that was previously established between the first party and the second party. This pre-shared secret key is subsequently used in forming at least one subsequent communication between the first party and the second party.

In one embodiment of the present invention, establishing the negotiated secret key involves using the Diffie-Hellman method to establish the negotiated secret key.

In one embodiment of the present invention, the second party is a firewall through which the first party seeks to communicate.

In one embodiment of the present invention, the first party is a person seeking to communicate through the firewall from one of a number of possible Internet Protocol (IP) addresses.

In one embodiment of the present invention, the group secret key is one of a plurality of group secret keys maintained by the group.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
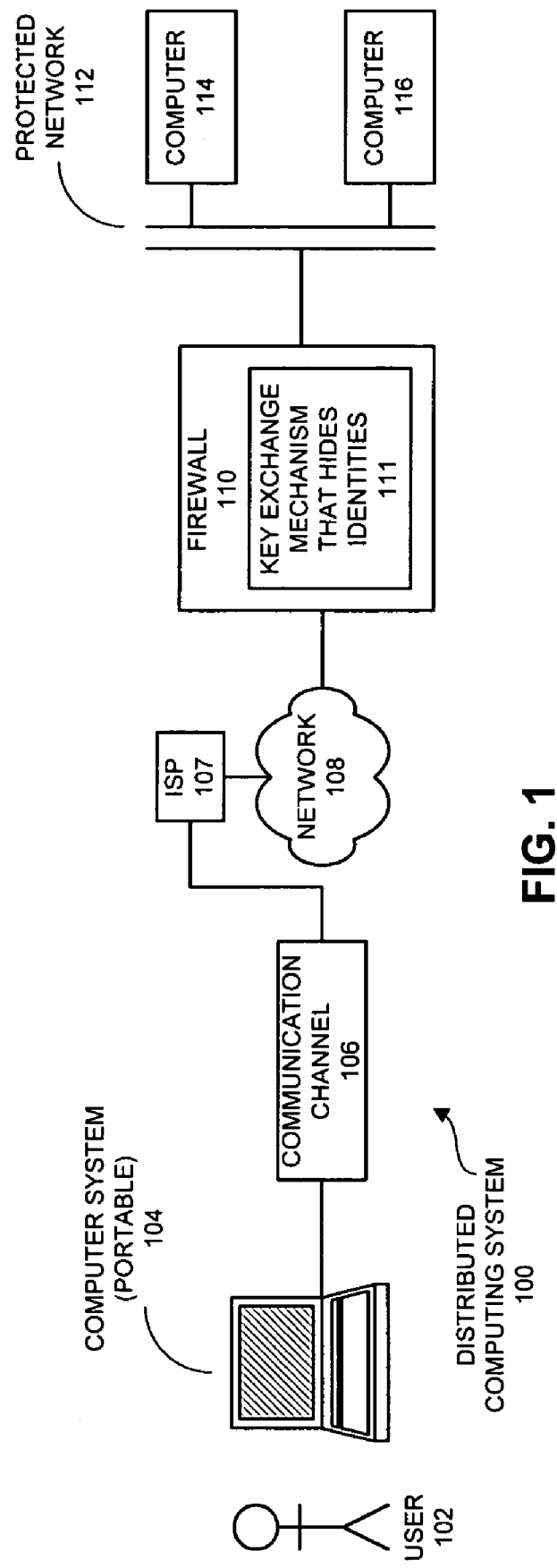
FIG. 1 illustrates a distributed computing system in accordance with an embodiment of the present invention.
Figure 2:
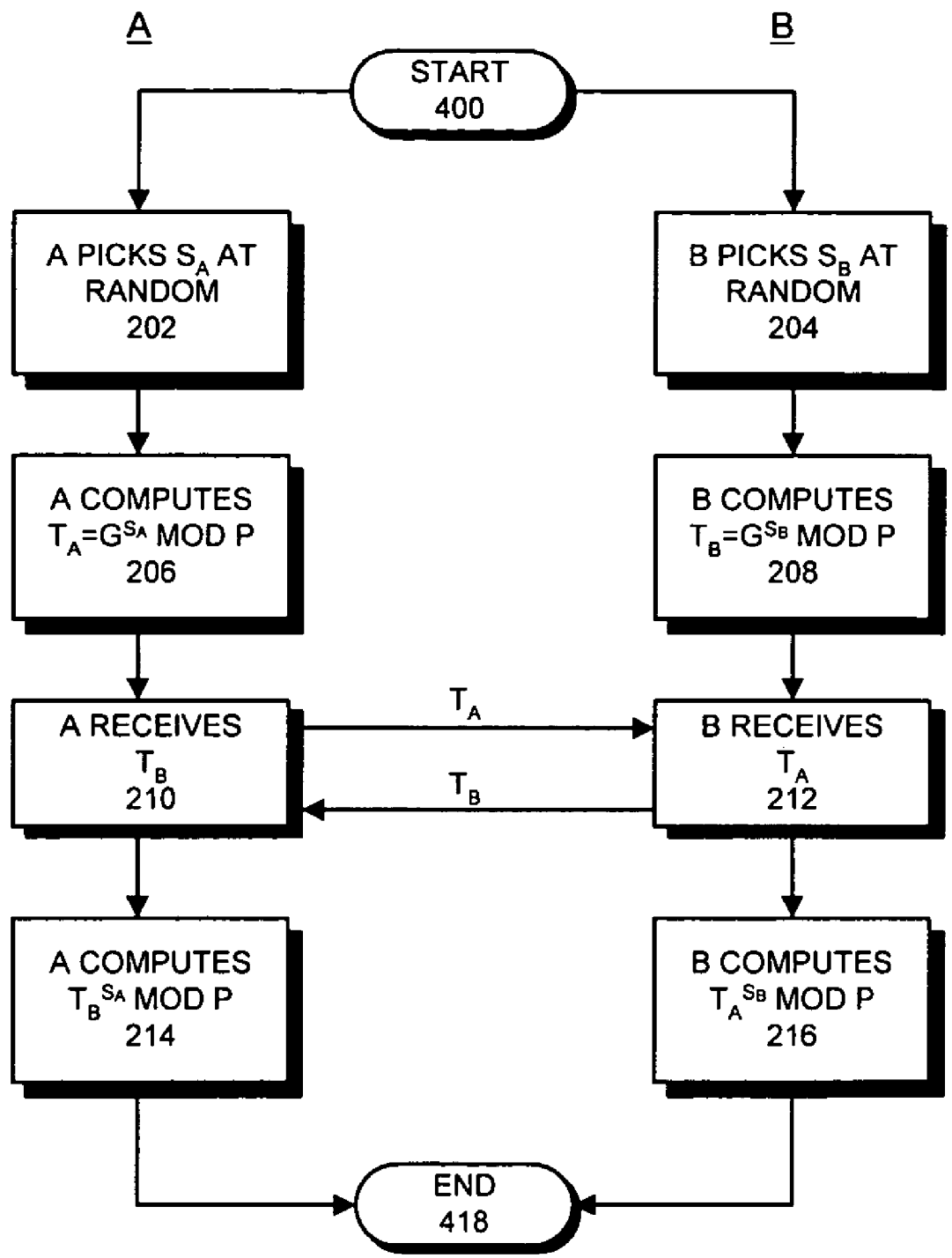
FIG. 2 is a flow chart illustrating the Diffie-Hellman method in accordance with an embodiment of the present invention.

FIG. 1 illustrates a distributed computing system 100 in accordance with an embodiment of the present invention. Distributed computing system 100 includes a portable computer system 104, which is coupled to a network 108 through communication channel 106 and Internet Service provider (ISP) 107. Distributed computing system 100 also includes computer systems 114 and 116 residing on protected network 112, which are coupled to network 108 through firewall 110.

Network 108 can generally include any type of wire or wireless communication channel capable of coupling together computing nodes. This includes, but is not limited to, a local area network, a wide area network, or a combination of networks. In one embodiment of the present invention, network 108 includes the Internet.

Similarly, protected network 112 can generally include any type of wire or wireless communication channel capable of coupling together computing nodes that is protected from a public network. This includes, but is not limited to, a local area network, a wide area network, or a combination of networks.

Computer systems 104, 114 and 116 (and firewall 110) can generally include any type of computer system, including, but is not limited to, a computer system based on a microprocessor, a mainframe computer, a digital signal processor, a portable computing device, a personal organizer, a device controller, and a computational engine within an appliance.

Recall that computer system 104 is coupled to network 108 through communication channel 106 and ISP 107. Communication channel 106 can include any mechanism through which computer system 104 can communicate with ISP 107. This includes, but is not limited to, a modem connection through a telephone line, a digital subscriber line (DSL) connection or a cable modem connection. ISP 107 can include any mechanism through which computer system 104 is able to access the network 108.

Firewall 110 can include any mechanism that protects computer systems 114 and 116 on protected network 112 from communications across network 108. Note that all communications between network 108 and protected network 112 pass through firewall 110, which allows firewall 110 to screen these communications for security purposes.

Also note that firewall 110 includes key exchange mechanism 111, which hides the identities of parties involved in the key exchange process in accordance with an embodiment of the present invention.

The system illustrated in FIG. 1 operates generally as follows. User 102 operating computer system 104 seeks to access computer systems 114 and 116 located on protected network 112. In order to do so, computer system 104 communicates with key exchange mechanism 111 within firewall 110 to set up an encrypted communication pathway between computer system 104 and firewall 110 using a pre-shared secret key 314 (see FIG. 3). Key exchange mechanism 111 sets up this communication pathway without divulging the identity of user 102 (or computer system 104) to an active or passive attacker. This process is described in more detail below with reference to FIGS. 3 and 4.

Note that although the present invention is described in the context of a portable computer system 104 that communicates with a firewall 110, the present invention can generally be applied to establishing a secure communication pathway between any two entities, and is not limited to a portable computer system 104 or a firewall 110.

Key Exchange Protocol

Figure 3:
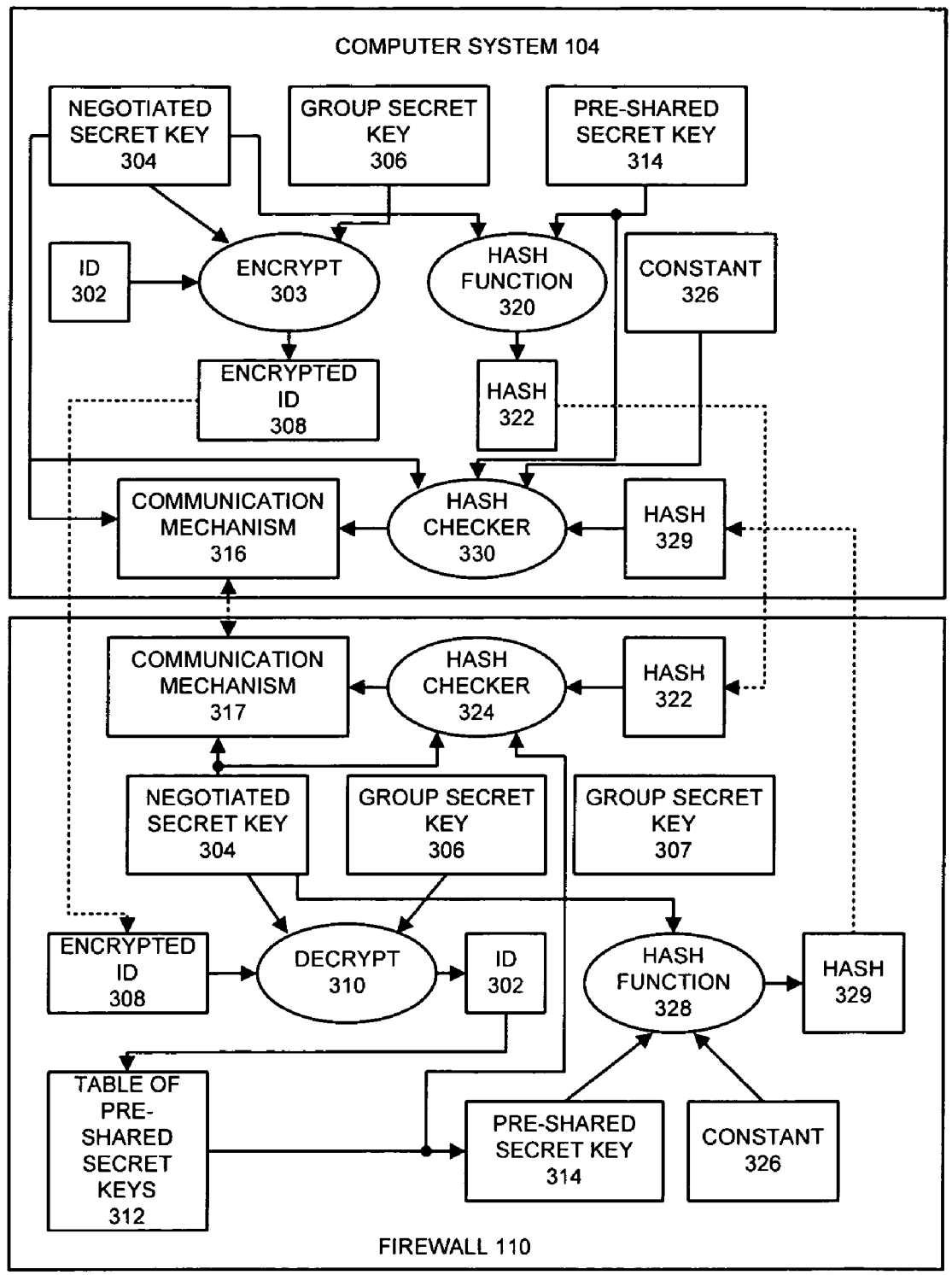
FIG. 3 illustrates how an identifier is securely transferred from a remote computer system to a firewall in accordance with an embodiment of the present invention.

FIG. 3 illustrates how an identifier (ID) 302 is securely transferred from remote computer system 104 to firewall 110 in accordance with an embodiment of the present invention. Note that ID 302 can include an identifier for user 102 and/or identifier for computer system 104.

Computer system 104 and firewall 110 first perform a Diffie-Hellman exchange to agree upon a negotiated secret key 304.

Next, computer system 104 encrypts ID 302 using both negotiated secret key 304 and group secret key 306 to form encrypted ID 308. Note that any type of symmetric encryption mechanism or algorithm can be used to perform this encryption, and any function of group secret key 306 and negotiated secret key 304 can be used to form the key for that encryption.

Group secret key 306 is a key that is known by the members of a group to which user 102 belongs. For security reasons, group secret key 306 may need to be periodically changed. Also note that there may exist another group secret key 307 within firewall 110. This allows different group secret keys to be used for different purposes. These different purposes can include: facilitating key rollover to periodically change keys; providing different keys for different levels of security; and providing different keys for different sub-organizations. Note that if there exist multiple group keys, a specific identifier for a group secret key must be communicated, or there must exist few enough group secret keys for firewall 110 to try them all.

Computer system 104 also forms a hash 322 of negotiated secret key 304 and pre-shared secret key 314.

Next, encrypted ID 308 and hash 322 are sent to firewall 110. Encrypted ID 308 it is decrypted using both negotiated secret key 304 and group secret key 306 to restore ID 302. Note that by using group secret key 306, ID 302 is protected from an active attacker who intercepts communications from computer system 104 and impersonates firewall 110 in performing the Diffie-Hellman exchange to obtain negotiated secret key 304.

Next, ID 302 is used to look up pre-shared secret key 314 within a table of pre-shared secret keys 312. Table of pre-shared secret keys 312 can generally be organized as any type of lookup structure that can be used to store and retrieve pre-shared secret keys.

Next, hash 322 is checked using negotiated secret key 304 and pre-shared secret key 314. If it is properly formed, firewall forms a hash 329 of negotiated secret key 304, pre-shared secret key 314 and constant 326.

Next, hash 329 is sent to firewall 110, where it is checked using negotiated secret key 304, pre-shared secret key 314 and constant 326. If hash 329 is properly formed, communication mechanism 317 within firewall 110 then uses negotiated secret key 304 to encrypt communications with communication mechanism 316 in computer system 104. Similarly, communication mechanism 316 within computer system 104 uses negotiated secret key 304 to encrypt communications with communication mechanism 316 in firewall 110.

Note that each user within the group has its own pre-shared secret key, which is stored within table of pre-shared secret keys 312. This prevents a given user within a group from impersonating another user within the group.

Figure 4A:
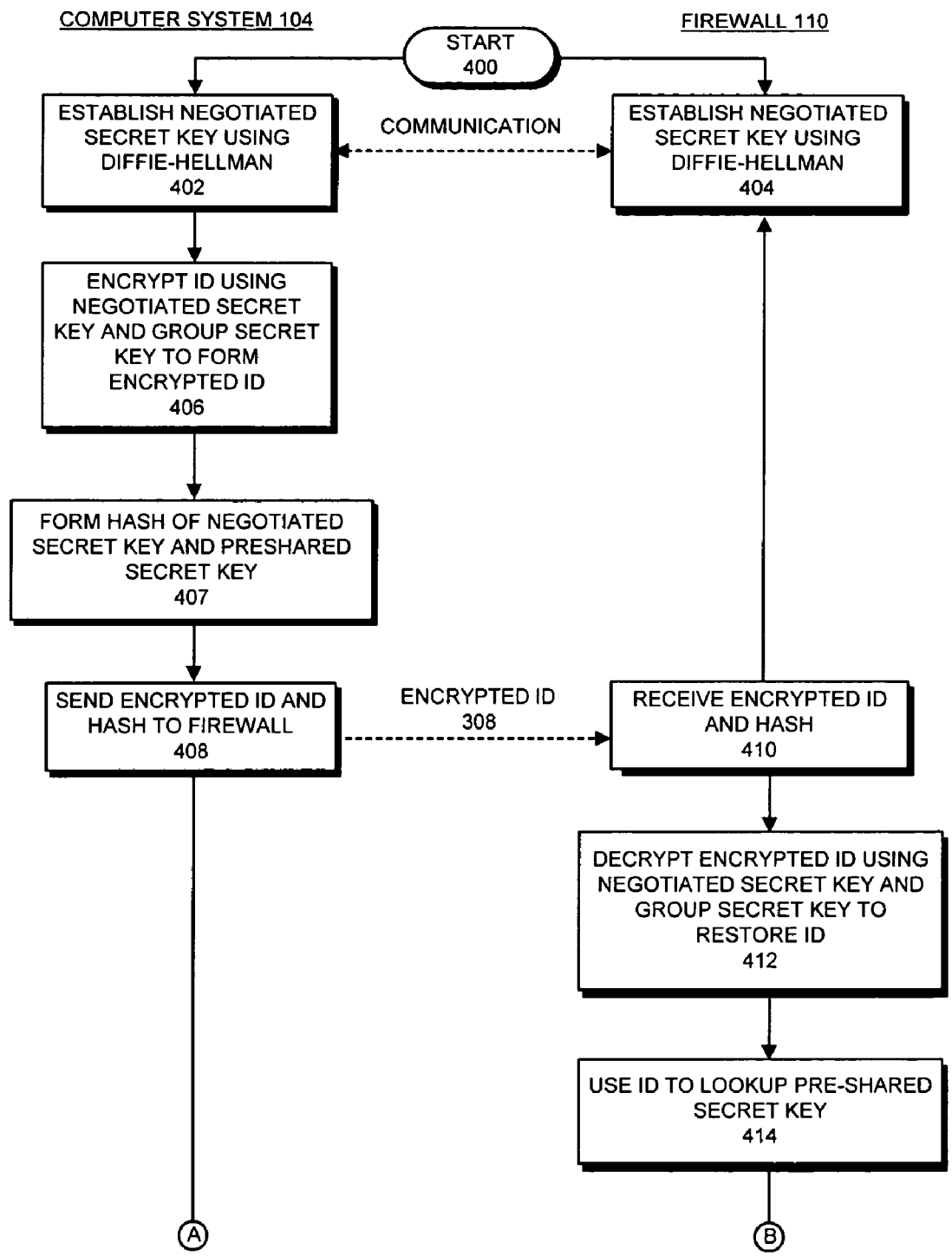
FIG. 4A is a first portion of a flow chart of a key exchange protocol that operates with a pre-shared key and that hides the identities of entities involved in the key exchange in accordance with an embodiment of the present invention.
Figure 4B:
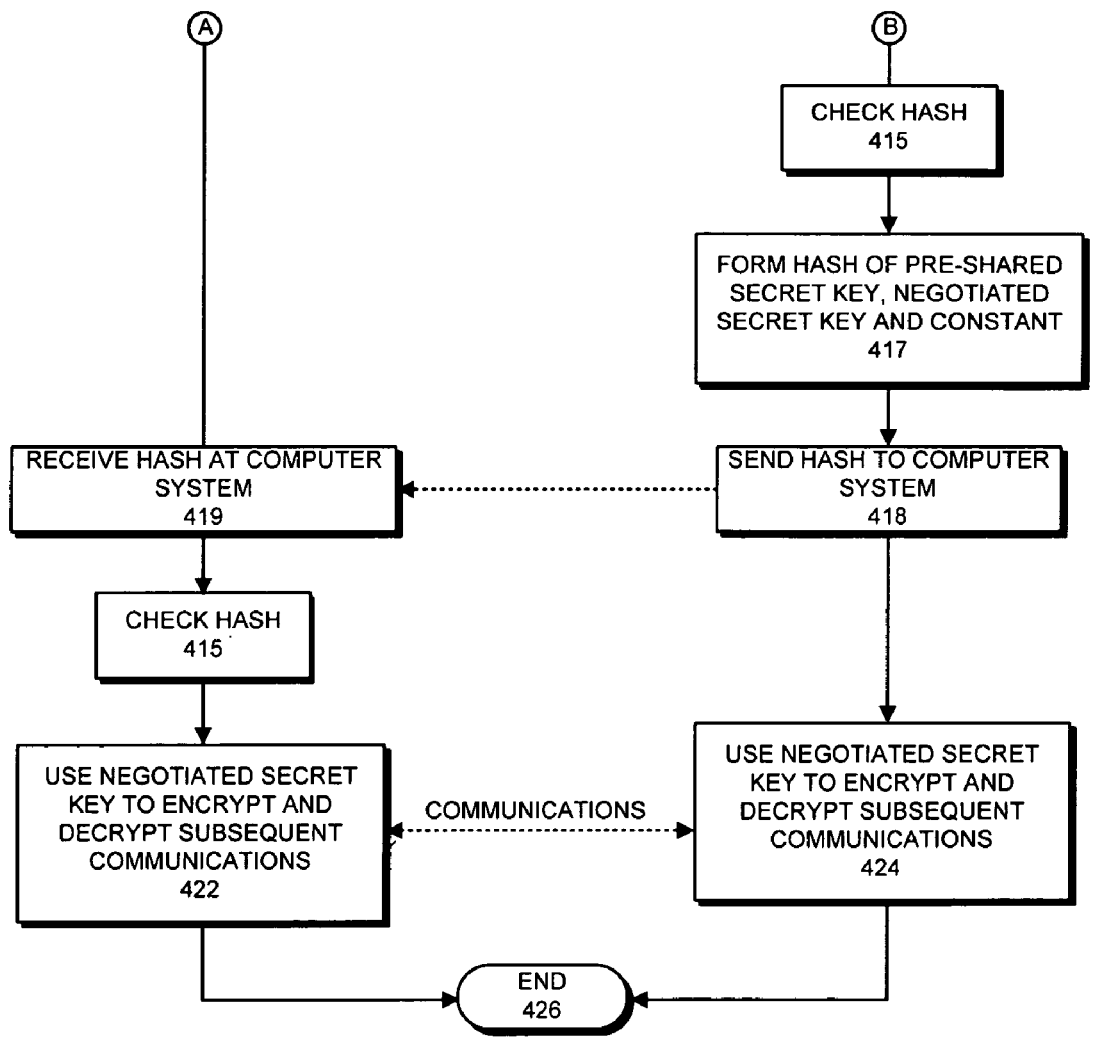
FIG. 4B is a second portion of a flow chart of a key exchange protocol that operates with a pre-shared key and that hides the identities of entities involved in the key exchange in accordance with an embodiment of the present invention.

FIGS. 4A and 4B present a flow chart of a key exchange protocol that operates with a pre-shared key and hides the identities of entities involved in the key exchange in accordance with an embodiment of the present invention. This flow chart illustrates the operations of computer system 104 in the left-hand column, and computer firewall 110 in the right-hand column.

Computer system 104 and firewall 110 first establish a negotiated secret key 304 by performing a Diffie-Hellman exchange across network 108 (steps 402 and 404). Note that in general any secure method that enables computer system 104 and firewall 110 to agree upon a negotiated secret key can be used.

Next, computer system 104 encrypts ID 302 using negotiated secret key 304 and group secret key 306 to form encrypted ID 308 (step 406). Computer system 104 also forms a hash 322 of negotiated secret key 304 and pre-shared secret key 314 (step 407).

Computer system 104 then sends encrypted ID 308 and hash 322 across network 108 to firewall 110 (step 408).

Upon receiving encrypted ID 308 and hash 322 (step 410), firewall 110 decrypts encrypted ID 308 using both negotiated secret key 304 and group secret key 306 to restore ID 302 (step 412).

Next, firewall 110 uses ID 302 to lookup pre-shared secret key 314 from the table of pre-shared secret keys 312 (step 414).

Firewall 110 than uses pre-shared secret key 314 and negotiated secret key 304 to check hash 322 (step 415). If hash 322 is properly formed, firewall 110 forms a hash 329 of negotiated secret key 304, pre-shared secret key 314 and constant 326.

Next, hash 329 is sent to computer system 104, where it is checked using negotiated secret key 304, pre-shared secret key 314 and constant 326. If hash 329 is properly formed, communication mechanism 317 within firewall 110 subsequently uses negotiated secret key 304 to encrypt communications with communication mechanism 316 in computer system 104. Similarly, communication mechanism 316 within computer system 104 subsequently uses negotiated secret key 304 to encrypt communications with communication mechanism 317 in firewall 110.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating a key exchange that operates with a pre-shared secret key and that hides identities of parties involved in the key exchange, comprising:
   initially establishing a negotiated secret key between a first party and a second party by performing communications between the first party and the second party across a network;
   wherein the communications between the first party and the second party do not allow an eavesdropper to determine the negotiated secret key;
   encrypting an identifier for the first party using a first key that is a function of a group secret key and the negotiated secret key to form an encrypted identifier;
   wherein the group secret key is known to members of a group, including the first party and the second party, but is kept secret from parties outside of the group;
   sending the encrypted identifier from the first party across the network to the second party;
   allowing the second party to decrypt the encrypted identifier by using the group secret key and the negotiated secret key;
   allowing the second party to use the identifier to look up the pre-shared secret key in a table of pre-shared secret keys that was previously established between the first party and the second party; and
   using the pre-shared secret key in forming at least one subsequent communication between the first party and the second party.

2. The method of claim 1, wherein establishing the negotiated secret key involves using the Diffie-Hellman method to establish the negotiated secret key.

3. The method of claim 1, wherein the second party is a firewall through which the first party seeks to communicate.

4. The method of claim 3, wherein the first party is a person seeking to communicate through the firewall from one of a number of possible Internet Protocol (IP) addresses.

5. The method of claim 1, wherein the group secret key is one of a plurality of group secret keys maintained by the group.

6. A method for facilitating a key exchange that operates with a pre-shared secret key and that hides identities of parties involved in the key exchange, comprising:
   initially establishing a negotiated secret key between a first party and a second party by performing communications between the first party and the second party across a network;
   wherein the communications between the first party and the second party do not allow an eavesdropper to determine the negotiated secret key;

allowing the first party to encrypt an identifier for the first using a first key that is a function of a group secret key and the negotiated secret key to form an encrypted identifier;

wherein the group secret key is known to members of a group, including the first party and the second party, but is kept secret from parties outside of the group;

receiving the encrypted identifier at the second party from the first party across the network;

decrypting the encrypted identifier by using the group secret key and the negotiated secret key;

using the identifier to lookup the pre-shared secret key in a table of pre-shared secret keys that was previously established between the first party and the second party; and using the pre-shared secret key in forming at least one subsequent communication between the first party and the second party.

7. The method of claim 6, wherein establishing the negotiated secret key involves using the Diffie-Hellman method to establish the negotiated secret key.

8. The method of claim 6, wherein the second party is a firewall through which the first party seeks to communicate.

9. The method of claim 8, wherein the first party is a person seeking to communicate through the firewall from one of a number of possible Internet Protocol (IP) addresses.

10. The method of claim 6, wherein the group secret key is one of a plurality of group secret keys maintained by the group.

11. A computer-readable storage medium storing instructions that when executed by a computer cause the computer to perform a method for facilitating a key exchange that operates with a pre-shared secret key and that hides identities of parties involved in the key exchange, the method comprising:

initially establishing a negotiated secret key between a first party and a second party by performing communications between the first party and the second party across a network;

wherein the communications between the first party and the second party do not allow an eavesdropper to determine the negotiated secret key;

encrypting an identifier for the first party using a first key that is a function of a group secret key and the negotiated secret key to form an encrypted identifier;

wherein the group secret key is known to members of a group, including the first party and the second party, but is kept secret from parties outside of the group;

sending the encrypted identifier from the first party across the network to the second party;

allowing the second party to decrypt the encrypted identifier by using the group secret key and the negotiated secret key;

allowing the second party to use the identifier to look up the pre-shared secret key in a table of pre-shared secret keys that was previously established between the first party and the second party; and using the pre-shared secret key in forming at least one subsequent communication between the first party and the second party.

12. The computer-readable storage medium of claim 11, wherein establishing the negotiated secret key involves using the Diffie-Hellman method to establish the negotiated secret key.

13. The computer-readable storage medium of claim 11, wherein the second party is a firewall through which the first party seeks to communicate.

14. The computer-readable storage medium of claim 13, wherein the first party is a person seeking to communicate through the firewall from one of a number of possible Internet Protocol (IP) addresses.

15. The computer-readable storage medium of claim 11, wherein the group secret key is one of a plurality of group secret keys maintained by the group.

16. A computer-readable storage medium storing instructions that when executed by a computer cause the computer to perform a method for facilitating a key exchange that operates with a pre-shared secret key and that hides identities of parties involved in the key exchange, the method comprising:

establishing a negotiated secret key between a first party and a second party by performing communications between the first party and the second party across a network;

wherein the communications between the first party and the second party do not allow an eavesdropper to determine the negotiated secret key;

allowing the first party to encrypt an identifier for the first party using a first key that is a function of a group secret key and the negotiated secret key to form an encrypted identifier;

wherein the group secret key is known to members of a group, including the first party and the second party, but is kept secret from parties outside of the group;

receiving the encrypted identifier at the second party from the first party across the network;

decrypting the encrypted identifier by using the group secret key and the negotiated secret key;

using the identifier to lookup the pre-shared secret key in a table of pre-shared secret keys that was previously established between the first party and the second party; and using the pre-shared secret key in forming at least one subsequent communication between the first party and the second party.

17. An apparatus that facilitates a key exchange that operates with a pre-shared secret key and that hides identities of parties involved in the key exchange, the apparatus comprising:

establishing a negotiated secret key between a first party and a second party by performing communications between the first party and the second party across a network;

wherein the communications between the first party and the second party do not allow an eavesdropper to determine the negotiated secret key;

an encryption mechanism that is configured to encrypt an identifier for the first party using a first key that is a function of a group secret key and the negotiated secret key to form an encrypted identifier;

wherein the group secret key is known to members of a group, including the first party and the second party, but is kept secret from parties outside of the group;

a communication mechanism that is configured to send the encrypted identifier from the first party across the network to the second party, so that the second party can decrypt the encrypted identifier by using the group secret key and the negotiated secret key in order to use the identifier to lookup the pre-shared secret key in a table of pre-shared secret keys that was previously established between the first party and the second party; and wherein the communication mechanism is additionally configured to use the pre-shared secret key to encrypt at least one subsequent communication between the first party and the second party.

18. The apparatus of claim 17, wherein establishing the negotiated secret key involves using the Diffie-Hellman method to establish the negotiated secret key.

19. The apparatus of claim 17, wherein the second party is a firewall through which the first party seeks to communicate.

20. The apparatus of claim 19, wherein the first party is a person seeking to communicate through the firewall from one of a number of possible Internet Protocol (IP) addresses.

21. The apparatus of claim 17, wherein the group secret key is one of a plurality of group secret keys maintained by the group.

22. An apparatus that facilitates a key exchange that operates with a pre-shared secret key and that hides identities of parties involved in the key exchange, the apparatus comprising:

establishing a negotiated secret key between a first party and a second party by performing communications between the first party and the second party across a network;

wherein the communications between the first party and the second party do not allow an eavesdropper to determine the negotiated secret key;

a communication mechanism that is configured to receive an encrypted identifier at the second party from the first party across the network;

wherein the encrypted identifier was produced by encrypting an identifier for the first party using a first key that is a function of a group secret key and the negotiated secret key;

wherein the group secret key is known to members of a group, including the first party and the second party, but is kept secret from parties outside of the group;

a decryption mechanism that is configured to decrypt the encrypted identifier by using the group secret key and the negotiated secret key;

a lookup mechanism that is configured to use the identifier to look up the pre-shared secret key in a table of pre-shared secret keys that was previously established between the first party and the second party; and wherein the communication mechanism is additionally configured to use the pre-shared secret key in forming at least one subsequent communication between the first party and the second party.

* * * * *